United States Patent
Parviainen (10) Patent No.: US 11,186,725 B2
(45) Date of Patent: Nov. 30, 2021

(54) SOLVENT SYSTEM AND METHOD OF PREPARING WATER BASED AEROSOL BASE PAINT

(71) Applicant: Wisespray International Ltd, Helsinki (FI)

(72) Inventor: Ilkka Parviainen, Helsinki (FI)

(73) Assignee: Wisespray International Ltd, Helsinki (FI)

( * ) Notice: Subject to any disclaimer, the term of this patent is extended or adjusted under 35 U.S.C. 154(b) by 129 days.

(21) Appl. No.: 16/491,171

(22) PCT Filed: Mar. 6, 2018

(86) PCT No.: PCT/FI2018/050166
§ 371 (c)(1),
(2) Date: Sep. 5, 2019

(87) PCT Pub. No.: WO2018/162800
PCT Pub. Date: Sep. 13, 2018

(65) Prior Publication Data
US 2020/0032076 A1    Jan. 30, 2020

(30) Foreign Application Priority Data
Mar. 6, 2017   (FI) ..................................... 20170036

(51) Int. Cl.
*C09D 5/02* (2006.01)
*B65D 83/14* (2006.01)
*C08K 3/20* (2006.01)
*C09D 167/08* (2006.01)
*C09D 133/00* (2006.01)
*C09D 175/06* (2006.01)
*C09K 3/30* (2006.01)
*C08K 3/22* (2006.01)

(52) U.S. Cl.
CPC ............. *C09D 5/021* (2013.01); *B65D 83/14* (2013.01); *C08K 3/20* (2013.01); *C09D 5/022* (2013.01); *C09D 5/028* (2013.01); *C09D 133/00* (2013.01); *C09D 167/08* (2013.01); *C09D 175/06* (2013.01); *C09K 3/30* (2013.01); *C08K 2003/2241* (2013.01)

(58) Field of Classification Search
CPC .... C09D 5/021; C09D 167/08; C09D 133/00; C09D 175/06
USPC .......................................................... 524/378
See application file for complete search history.

(56) References Cited

U.S. PATENT DOCUMENTS

| | | | |
|---|---|---|---|
| 4,420,575 A * | 12/1983 | Rapaport ............... | C09D 5/021 106/252 |
| 5,988,455 A | 11/1999 | Pearson | |
| 6,135,165 A | 10/2000 | Zanellato et al. | |
| 6,543,490 B1 | 4/2003 | Owens | |
| 7,201,191 B2 | 4/2007 | Heatley et al. | |
| 7,935,183 B1 | 5/2011 | Coello et al. | |
| 2005/0070638 A1 | 3/2005 | Coello et al. | |
| 2006/0260714 A1 * | 11/2006 | Heatley ................. | C09D 5/021 141/329 |
| 2008/0021144 A1 | 1/2008 | Stahlberg et al. | |
| 2008/0161480 A1 | 7/2008 | Perumal | |
| 2012/0260824 A1 | 10/2012 | Mccombs | |
| 2016/0002475 A1 | 1/2016 | Potthoff et al. | |
| 2017/0267868 A1 | 9/2017 | Halstead | |

FOREIGN PATENT DOCUMENTS

| | | |
|---|---|---|
| CN | 106217677 A | 12/2016 |
| EP | 0439026 A2 | 7/1991 |
| GB | 2259919 A | 3/1993 |
| WO | 2017/098080 A1 | 6/2017 |

* cited by examiner

*Primary Examiner* — Hui H Chin
(74) *Attorney, Agent, or Firm* — Meunier Carlin & Curfman LLC (57) ABSTRACT

A solvent system is provided, which enables increased amount of exact color tone recipes even when using with currently known dispensing machines having a minimum dispensing limit of 0.01-0.02 ml of a color paste component. The system enables a capability of tinting paints in a tone-accurate manner even into aerosol paint cans of small filling volume. The system provides a capability of radically reducing the amount of various ready-to-use aerosol paints and aerosol base paints stocked by a storekeeper. The disclosure provides an aerosol paint for tinting, as well as a tinted aerosol paint which is suitable for use in a process of mechanized tinting, and by which a good paint coverage on a painted surface is achieved.

18 Claims, 4 Drawing Sheets

| RAL 1023 | | 225g | | RAL 5014 | | 225g | | RAL 7042 | | 225g |
|---|---|---|---|---|---|---|---|---|---|---|
| AAM | 82 | 20,5 | | ABN | 119,5 | 29,875 | | ABN | 165,6 | 41,4 |
| ABN | 12,5 | 3,125 | | AAZ | 5,3 | 1,325 | | AAZ | 0,5 | 0,125 |
| AOC | 8,4 | 2,1 | | ANG | 7,1 | 1,775 | | ANG | 11,1 | 2,775 |
| | | | | ANG | 5,5 | 1,375 | | AOC | 3,3 | 0,825 |

| RAL 1001 | | | | RAL 5015 | | | | RAL 8000 | | |
|---|---|---|---|---|---|---|---|---|---|---|
| ABN | 119,5 | 29,875 | | AAZ | 26,3 | 6,575 | | ABN | 12 | 3 |
| AOC | 19,1 | 4,775 | | ABN | 57 | 14,25 | | ANG | 6 | 1,5 |
| AVL | 0,85 | 0,2125 | | AOC | 2,1 | 0,525 | | AOC | 48,5 | 12,125 |
| | | | | AVL | 2,7 | 0,675 | | APR | 2,6 | 0,65 |

| RAL 1032 | | | | RAL 7002 | | | | RAL 8002 | | |
|---|---|---|---|---|---|---|---|---|---|---|
| AAM | 50 | 12,5 | | ABN | 44,6 | 11,15 | | ABN | 21,5 | 5,375 |
| ABN | 11,4 | 2,85 | | ANG | 10,5 | 2,625 | | ANG | 11 | 2,75 |
| AOC | 28 | 7 | | AOC | 15,8 | 3,95 | | AOC | 15,7 | 3,925 |
| | | | | APR | 0,9 | 0,225 | | APR | 19,8 | 4,95 |

| RAL 4005 | | | | RAL 7024 | | | | RAL 8015 | | |
|---|---|---|---|---|---|---|---|---|---|---|
| ABN | 58,6 | 14,65 | | AAZ | 0,7 | 0,175 | | ABN | 7,3 | 1,825 |
| APR | 5,1 | 1,275 | | ABN | 17 | 4,25 | | ANG | 9,6 | 2,4 |
| AVL | 18,2 | 4,55 | | ANG | 32 | 8 | | APR | 29,3 | 7,325 |
| ANG | 0,8 | 0,2 | | AVL | 1,7 | 0,425 | | AVL | 12,3 | 3,075 |

SOLVENT SYSTEM AND METHOD OF PREPARING WATER BASED AEROSOL BASE PAINT

PRIORITY

This application is a U.S. national application of the international application number PCT/FI2018/050166 filed on Mar. 6, 2018 and claiming priority of Finnish application 20170036 filed on Mar. 6, 2017 the contents of all of which are incorporated herein by reference.

FIELD OF THE INVENTION

The invention relates to a solvent system according to the claims.

The invention relates also to a method of preparing a water based aerosol paint (to be tinted to various colors) into an aerosol can.

The invention relates further to a water based aerosol paint (to be tinted into various colors) prepared into a pressurized and sealed aerosol can.

The invention relates also to a method of preparing a tinted aerosol paint into a pressurized and sealed aerosol can, as well as to a respective tinted aerosol paint and use of the tinted aerosol paint.

BACKGROUND OF THE INVENTION

At present, aerosol paints are mainly sold as aerosol paints in ready-to-use tones. From the standpoint of a consumer, the situation is inconvenient should he/she wish to have an aerosol paint of some specific tone, whereby selecting and finding a correct color from the store shelf can be challenging. From the standpoint of a storekeeper, on the other hand, a problem is the necessity of having to keep in stock and for sale a wide variety of different aerosol paints in ready-to-use tones. The tinting of a single aerosol paint bottle is only possible in a commercially available, so-called self-fill aerosol container (=aerosol can), wherein the prefilled aerosol container is loaded from a filling cup with a ready-to-use paint mixture which contains both a binder and color pastes for predetermined color tone. Here, the retailer weighs each color paste manually and adds a possible binder and mixes the color pastes and the binder by hand. Such manual tinting of aerosol paints into a self-fill bottle is laborious, time consuming, and prone to errors.

This problem could be solved if aerosol paints could be tinted in a mechanized manner at the shop to a precisely desired color. Tinting of aerosol paints, and even more specifically water based aerosol paints, to precisely desired tone is quite inconvenient or even impossible with today's automatic paint tinting machines (called also as dispensing machines).

Automatic tinting machines are available, but they are intended for tinting base paints in large containers (usually several liters). These devices work commonly in such a way, that color pastes are metered straight or via a filling cup into the base paint from paste containers. These tinting devices are intended to be used with so called base paint in large containers. These tinting devices include an item of software, by which are composed dispensing instructions i.e. color tone recipes to color paste mixtures. These color tone recipes will give dispensing ratios and/or dispensing amounts of individual color paste components for composing a color paste mixture having a predetermined tint. On the basis of these color tone recipes is the operation of the tinting machine controlled: each color paste component is pumped by the action of color paste dispenser straight into the paint container. In tinting devices for water-soluble bucket paints with bigger volumes (from about 250 to 25000 ml) concentrated color paste compounds are dispensed either straight or via a cup into a binder-containing paint, that is, into so called "base paint", which is normally a white or transparent paint which already contains binder. Typically, the filling cup of a tinting machine for bucket paints has a volume of not more than 100 ml. Although these automatic machines for tinting base paint are fashioned for large amounts of paint, the minimum dosage of each color paste is normally said to be of the order 0.077 (see dispensing machines made for example by Corob, SATint etc.)

However, the inventor of the present application have quite surprising found that actually these dispensing machines intended for tinting large several liter of base paint (bucket paints) have actually much lower limit for accurate dispensing of color paste component; this limit is actually in the order of 0.1-0.2 ml not the one machine suppliers usually mention. From the view point of aerosol paints, this dispensing limit of color paste component is very high, because aerosol paints have much lower volume which would require also and tinting a much smaller amount of pigments to be delivered into base paint. When a color tone recipe, adapted to be used with conventional bucket paints, having a much bigger volume (normally at least 1000 ml or even 2700 ml) and such also a much bigger amount of binder, is tried to be converted into same kind of recipe for tinting same kind of aerosol paints they are usually failed. The main reason for failure is the smaller amount of binders, additives, solvents etc. present in an aerosol can having much smaller filling volume (usually 400-1000 ml). Because pigments should be in a balance with other part of paint components, this will lead the amount of individual color paste component falling under said minimum dispensing limit 0.01-0.02 ml.

The second main problem with aerosol paint is the incompatibility of some propellants, mainly dimethyl ether, with many common binders. Dimethyl ether itself is a polar, water compatible solvent but also a very strong diluent, which will attack many common binders in a water-based solvent system and render them sticky, large molecules when storing time is extended. Therefore, the shelf lime and thus storage time of this kind of aerosol paints has been very limited. To raise this basic incompatibility of binders in DME containing water-based solvents it has been kept the binder concentration very low in aerosol paints. Low concentration of binder composition restricts considerably the amount of paint components (pigments, additives etc.).

Above mentioned two problems have been the main reasons, why there is no mechanized model of tinting machine commercially available for tinting a base paint of a single aerosol can or few aerosol cans.

The only possibility for some degree of non-manual mixing of aerosol paints has been to tone a base paint first in some larger container into a proper color tone and then to pour 100 ml thereof into a filling cup of the tinting machine. In a case the filling volume of an aerosol can is for example 400 ml, then this filling cup would carry about 10-50 ml of color paste mixture and about 40-90 ml (about 50-140 g) of binder, which is then dispensed into the prefilled aerosol paint bottle of 400 volume.

SUMMARY OF THE INVENTION

With the above prior art as a starting point, it was an objective of the present invention to eliminate or at least alleviate the problems present in the foregoing prior art.

Accordingly, it was a first main objective of the invention to provide a system, which would enable increased amount of exact color tone recipes even when using with present dispensing machines having a proper minimum dispensing limit 0.01-0.02 ml of a color paste component. The recipes should be able to execute in accurate manner with todays mechanized tinting machines with small amounts of water-based aerosol paints or even with organic solvent-based aerosol paints. It should also provide a capability of tinting paints in a tone-accurate manner even into aerosol paint cans of small filling volume.

It was a second main objective of the invention to provide a method for the mechanized tinting of water based aerosol paints, which provides a capability of radically reducing the amount of various ready-to-use aerosol paints and aerosol base paints stocked by a storekeeper.

It was a third main objective of the invention to provide an aerosol paint to be tinted, as well as a tinted aerosol paint which is suitable for use in a process of mechanized tinting, and by which is achieved good paint coverage on a painted surface, and which is capable of providing various degrees of gloss for a paint coating (matte, semi-gloss, glossy).

It was a fourth main objective of the invention to provide a method for increasing the amount of binder in the base paint of an aerosol paint without compromising the shelf life of the aerosol paint.

The foregoing objectives are attained with a solvent system of claim 1 and a method of claim 15 for preparing a water based aerosol pain having an extended shelf life, to be tinted as well as with a tinted water based aerosol paint of claim 23 as well as with a tinted water based aerosol paint of claim 25 present in a pressurized and sealed aerosol can whose filling volume is V.

More specifically, the present invention relates to a two part water based solvent system. Solvent system comprises water, propellant and possible organic co-solvent, for tinting an aerosol paint in an aerosol can with a filling device having a cup having functionally connected thereto mechanized color paste dispensing elements which enable dispensing into the filling device's cup the liquid containing a color paste mixture in an amount A. Said solvent system contains a liquid present in the cup of an aerosol can filling device, which liquid occupies a volume V1 of a filling volume V2 of the cup, comprises with respect to its volume V1:
a color paste mixture 10-100% by volume having a predetermined color tone, water 0-90% by volume and a binder 0-90% by volume, which color paste mixture being made up of several color paste components, each of which have at least the volume $A_{min}$, by dispensing into the cup, with mechanized dispensing elements, each of said individual color paste components in a ratio defined by the recipe of the color paste mixture tone, whereby a base paint to be tinted comprising an emulsified binder, dispersed into water compatible solvent, present in the aerosol can, with a filling volume V and occupies, as a liquid under pressure a total volume of Vt of said filling volume V.

the base paint to be tinted comprises with respect to total weight: binder and a separate dispersing agent/emulsifier or an emulsified binder 15-80% w/w preferable 20-75% w/w and propellant 18-45% by weight, preferably 25-35% by weight.

said recipe of the color paste mixture tone is selected from the group of different recipes in which group each recipe defines the exact amount of each individual color paste compound to make up the color paste mixture having a predetermined color tone so that:

the volume and the amount of the color paste mixture have been adapted to depend on the aggregate volume and the amount of the binders in the aerosol can and in the filling cup; and the volume Amin of all color paste components in the selected color tone recipe for the color paste mixture, is at least the same as the minimum requirement for base paint to be toned in an accurate way with maximum color deviation of dE 1.0 preferably 0.7 from intended color tone of the toned base paint.

The dry content of the binder is preferable in the range of 25-45% by weight of the base paint to be tinted.

Preferable the volume $A_{min}$ is 0.01-0.02 ml of color paste compound, which is preferably adapted to be the same as the minimum dispensing volume of the dispensing element for tinting the base paint into selected color tone.

The maximum color deviation of dE means herein the maximum delta E. ΔE—(Delta E, dE) The measure of change in visual perception of two given colors.

Delta E is a metric for understanding how the human eye perceives color difference. On a typical scale, the Delta E value will range from 0 to 100. Delta E means herein Delta E 2000 originating to CIE organization.

More specifically, the invention further relates also to a method of preparing a water based aerosol paint to be tinted into an aerosol can with a volume V, said aerosol base paint comprising a binder, a water-compatible solvent, as well as a propellant. The method comprises the following steps of:

dispensing into an aerosol can, whose filling volume is V, at least substances as follows, expressed as volume percent of the aerosol can filling volume:
a binder dispersed into a water-compatible solvent, 20-60% by volume wherein the binder and said solvent being added into the aerosol can jointly or separately, generating an overpressure in the aerosol can by adding a propellant 30-60% by volume and by sealing the aerosol can.

The invention relates also an aqueous aerosol paint to be tinted, formulated into a pressurized and sealed aerosol can and prepared with the afore-described method The invention also relates to a ready-to-use, tinted water-based aerosol paint, which is present in a pressurized and sealed aerosol can with a filling volume V and which comprises a color pigment a binder dispersed into a water-compatible solvent 65-80% by weight, and DME 20-35% by weight wherein dry content of said binder is 20-45% by weight from the total weight of the paint.

In a preferred embodiment of the invention, the aerosol paint is a non-flammable aerosol paint with a dry content of 32-35% by weight.

Propellant DME means herein dimethyl ether.

Generally speaking, the invention is based on two inventive ideas which have been combined successfully with each other:

The first inventive idea of the invention is to increase the binder concentration of base paint to be tinted.

When concentration of binder is too low one can simply provide the paint to be tinted with more pigments, fillers, primers etc. due to bigger critical volume of solids which a binder receive without its film making ability to worsen. If there is too small amount of binder present in the aerosol paint, it cannot receive a big amount of pigments without affecting negatively to film properties. Additionally, other components of paint should be also in balance with each other.

The present invention is first of all based on having the total amount of paste to be dispensed into an aerosol can dimensioned according to a solvent system that contains dimethyl ether and a considerable amount (more than 20% by weight and more than 25% by volume) of water-miscible binder. The final packaged aerosol paint has a dry binder content of 32-45% by weight and the entire aerosol container has a high total dry matter content of more than 25% by weight. This dry matter content is over two times more than in known aerosol paints.

That the aerosol base paint with such a high binder content is at all capable of being used in the preparation of aerosol paints is in itself quite surprising, because the aerosol base paints known, among others, from self-fill bottles, have hardly any binder content, and the binder content as well as the dry matter content of a ready-to-use, even toned aerosol paint remain lower than 10% by weight, even lower than 5% by weight. The development of aerosol has been considered to become more complicated and the painting result thereby to remain poor in a case these limits will be surpassed.

By using a solvent system with high binder concentration one can partly avoid the machine limitations (the lower dispensing limit is 0.01-0.02 ml of color paste components for common dispensing machines). Then, by setting the proper lower limit for color paste components to be delivered by dispensing element one can select those color paste recipes which can be realized with the present dispensing machines intended to be used in connection with bucket paints.

By setting the lower limit of deliverable paste component of each color tone recipe at the range of 0.1-0.2 not to the range machine suppliers have been presented, one can use effectively and accurately known dispensing machines which are intended for tinting bucket paints also for tinting of aerosol paints.

One aspect of the present invention is to divide the binder in a two-part solvent system. The first part of this solvent system is present in the aerosol can (base paint) and has a high dry binder content and the other part of the system is present in the filling cup and is adapted according to said first parts.

The solvent system comprises an aerosol base paint which is present in an aerosol can and has the afore-described high dry composition. Additionally, solvent system comprises the paste mixture which is present in the filling cup of a toning and dispensing device and may also be accompanied by a binder and water. The invention comprises dimensioning the total amount of paste according to a solvent system which comprises, on the one hand, a portion of the solvent system present in a filling cup as well as, on the other hand, a portion of the solvent system present in an aerosol can and serving at the same time as an aerosol base paint with a high binder content (35-70% by weight).

Thereby is attained a major benefit in providing a capability of preparing most of the toning recipes into an aerosol can with mechanized toning equipment, because the solvent system portions present in the filling cup and in the aerosol base paint complement each other. This provides an ability to employ just a few aerosol base paints which are each applicable for several tints. Being a pressurized liquid, the aerosol base paint present in an aerosol can contains at least most of the aqueous binder, all the propellant gas as well as the water-based solvent. Such an aerosol base paint is capable of being dimensioned so as to become compatible with a large number of paste mixtures toned in a mechanized manner, whereby is attained a major benefit of the storekeeper not having to stock but a few aerosol base paints into which can be toned in a precisely tinted manner a large portion of the toning recipes available for paste mixtures. What is gained as a remarkable further benefit is that, because the binder loaded in the base paint is compatible with the propellant and no foreign binder is added along with the color paste mixture, the toned product has a service life of at least months and possibly years.

In one preferred embodiment of the invention, the binder is an aqueous or water-compatible acrylic dispersion or acrylic emulsion, an alkyd resin, an oil-modified alkyd resin, an epoxy resin, a polyurethane resin, a polyurethane-modified alkyd resin, a polyurethane-modified alkyd resin having short or medium oil content, a styrene-butadiene emulsion, a styrene-butadiene dispersion. Preferably, the binder is a polyurethane-modified alkyd resin or an oil-modified alkyd resin.

In the most preferred embodiment of the present invention the resin is an alkyd resin, an oil-modified alkyd resin, a polyurethane resin, a polyurethane-modified alkyd resin or a polyurethane-modified alkyd resin having oil content at least 30% w/w.

By using this kind of binder one can increase the binder amount of the water based solvent system even in the presence of dimethyl ether. The binder has an oil tail, which allows the emulsifying agent/surface active agent to act properly even in the presence of DME and thus enables doing an aerosol paint with high concentration of binder.

The present invention is based on the idea that alkyd emulsions and polyurethane modified alkyd emulsions are made hardly without emulsifiers and/or surfactants. Mostly by leading steam in the liquid phase (alkyd liquid polymer+ emulsifier or alkyd-pu liquid polymer+emulsifier) is already enough.

The hydrophobic part of the emulsifier feels perfectly at home in the "oily" that is fatty acid part of an oil modified alkyd resin or oil modified polyurethane alkyd molecule and the influence of the dimethyl ether (DME) on the hydrophilic part of the emulsifier can be neglected. This leads to a stable mixture in the aerosol can that can be sprayed easily without blocking valve systems of the aerosol can. the wet fil has the ability to flow and form a film without the need of co-solvents.

Preferable alkyd resin (or polyurethane modified) alkyd resin contains less than 40% w/w of fatty acids (short oil alkyd resin) or 40-60% w/w of fatty acids thus being medium long oil alkyd resin (or polyurethane modified alkyd resin).

A short oil alkyd resin is an alkyd binder made with a short oil to alkyd resin ratio. The percentage of fatty acids in the short oil alkyd resins is less than 40 percent. These fatty acids act as the modifying agents in the resins. The short oil alkyd resins are generally oven dried because they cannot be air dried. Typical solvent systems for these products are the aliphatic solvents. Some may be cut in aromatics or oxygenated solvents for high solids. Most will accept infinite dilution with aliphatic solvents. In the case of short oil alkyds, these resins are generally oven dried and have a limited solubility only with aromatic and other non-aliphatic solvents.

Besides short oil alkyd resins, there are two more types of alkyd resins: long oil alkyd resins and medium oil alkyd resins.

Long oil alkyd resin contains more than 60% fatty acids by weight.

Medium oil alkyd resin contains 40% to 60% fatty acids by weight.

Short oil alkyd resin contains less than 40% fatty acids by weight.

Figure 4:
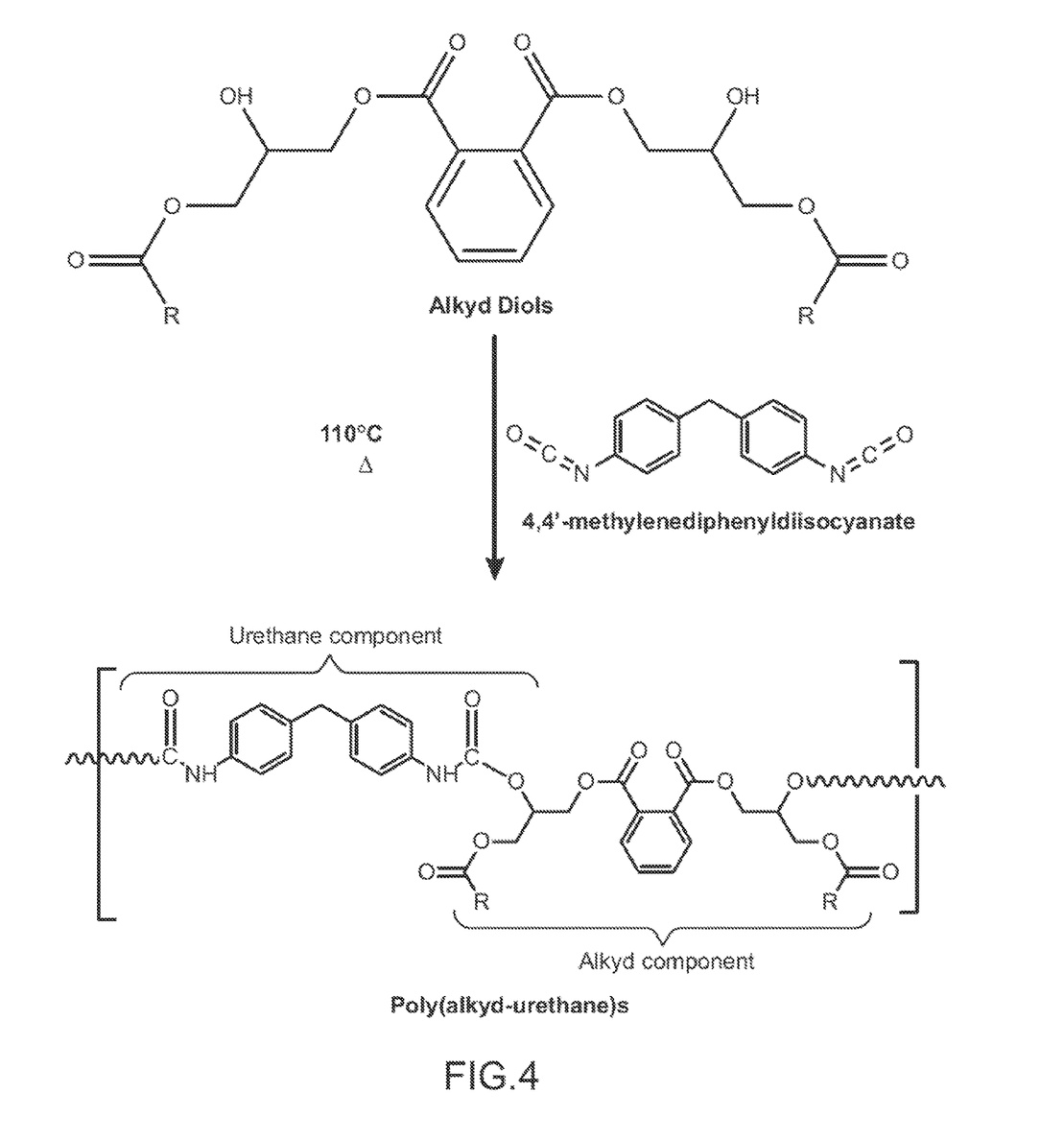
FIG. 4 shows the structure of poly(alkyd)-urethanes.

Structure is shown in FIG. 4.

This structure of alkyd oil resin or alkyd polyurethane oil resin is flexible and will not be attacked by the presence of dimethyl ether (DME). In principle are all components compatible.

This kind of polymer does do not need any co-solvent to form a film for the emulsified particles flow by themselves when the liquid phase will evaporate.

Contrary to this due to the hard acrylic shell the particles of acrylics and acryl/alkyd-emulsions are not so sensitive to emulsifiers (difficult to penetrate for the hydrophobic part of the emulsifier). This is the reason why they are dispersed in water instead of emulsified with the help of surfactants.

If these dispersions are used in an aerosol where the propellant is dimethyl ether, which is a strong solvent when present in an aerosol can 25-40% w/w), dimethyl ether will attack the hard acrylic shell and will (partly) dissolve or plasticize the shell. This will lead to a disturbance in acrylic or acryl/alkyd-emulsions because sticky, half dissolved binder parts will form (much bigger than the initial dispersion) that will block the valve system of an aerosol can. Co-solvent will tackify/partly dissolve the acrylic shell and will form a film.

Preferable alkyd oil or alkyd urethane oil resin is preferably selected from resins of class a)-f), which can be used for promoting non-flammable water-based aerosol paints having high binder concentration:

a) saponified/neutralized short oil alkyd which is water dilutable/emulsifiable having less than 40% of fatty acids,
b) saponified/neutralized medium oil alkyd which is water dilutable/emulsifiable having 40-60% of fatty acids,
c) emulsified/dispersed short oil alkyd having less than 40% of fatty acids,
d) emulsified/dispersed medium oil alkyd having 40-60% of fatty acids,
e) emulsified/dispersed polyurethane modified alkyd being chained with mid oil having 40-60% of fatty acids
f) emulsified/dispersed polyurethane modified alkyd being chained with short oil having less than 40% of fatty acids.

In example 7 have been given further examples of emulsified alkyd oils and emulsified polyurethane alkyd oils of above groups.

Due to a large amount of binder in the aerosol base paint and thereby also in the ready-to-use aerosol paint, the ready-to-use water-soluble aerosol paint in the present invention provides a coverage considerably better than what is obtained with ordinary aerosol paints.

Indeed, one aspect of the invention relates to a water-based aerosol paint, which comprises a color pigment, a water-compatible solvent at least 10% by weight, preferably 30-50% by weight, a binder 35-70% by weight (about 20-60% by volume), and DME 20-35% by weight.

By spraying this type of aerosol paint for example from an aerosol can with a filling volume of 400 ml to an intended site, it is possible to establish a paint coating with a surface area of at least 3 $m^2$, and the paint coating comprises at least one layer of paint with a layer thickness of at least 20 microns.

As for the prior art, the U.S. Pat. No. 7,201,191 has addressed a problem area slightly similar to that of the present invention, i.e. providing a solvent system that would enable mechanized toning and thereby a reduction in the number of ready-to-use toned aerosol paints stocked by a storekeeper. However, the problem connected to limitations of dispensing devices is not recognized herein. Additionally, in the above mentioned patent document it has a dry matter content only of about 5% by weight. Therefore, aerosol base paint of disclosed in U.S. Pat. No. 7,201,191 only provides a very limited number of color tone recipes which can be made with today automatic dispensing machines. In addition, the discussed patent provides no indication about discovering the benefits attained by apportioning the solvent system into a filling cup and into an aerosol base paint Additionally, using this kind of base paint, in order to achieve a precisely desired tint, it is always necessary to prepare a toning set and tone at least a minimum amount of paint, e.g. not less than 3 cans, for achieving a precisely desired tint.

Such a low dry matter content present in U.S. Pat. No. 7,201,191 functions primarily as a converter, so that the binder, which is basically incompatible with the propellant (DME) can be loaded into the aerosol can, in such a way that the aerosol paint would gain at least some sort of shelf life and painting result.

The invention further provides considerable additional benefits as follows.

In one preferred embodiment of the invention, both the aerosol base paint and the ready-to use aerosol paint contain a substantially lesser amount of propellant, especially DME, than before. In a preferred embodiment of the invention, the total amount of volatile organic compounds (VOC), especially DME, is not more than 27% by weight of the base paint and 24% w/w of the ready-to-use paint in the pressurized aerosol can.

Thereby is attained the essential advantage that the aerosol base paint of the invention, as well as the ready-to-use aerosol paint, are both non-combustible, do not smell, no paint dust disperses into the environment, the painted surface does not trickle.

Hereinafter, the benefits attainable with the invention, and solvent systems, an aerosol base paint, and ready-to-use toned aerosol paints needed therefore, will be described in even more detail.

It is an objective that the dry matter content of a water-soluble aerosol base paint could preferably be brought to about 30-40% by weight, whereby it lends itself to toning in a mechanized and tint-specific manner by supplementing this aerosol base paint with 1-35 ml of a color paste mixture. Because the dry matter content of a water-soluble aerosol base paint depends primarily on the amount of an aqueous binder, the water-based aerosol base paint of the invention, present in a pressurized and sealed aerosol can, comprises a possible color pigment ($TiO_2$), a water-compatible solvent at least 10% by weight, preferably 30-50% by weight, a binder 35-70% by weight, and a DME-containing propellant 20-35% by weight.

In this case, the final toned paint formulation prepared from this aerosol base paint is produced in such a way that the aerosol base paint of an aerosol can and the filling cup of a filling device are arranged to have an aggregate binder content of 25-45% by volume of the aerosol can filling volume, i.e. 20-45% by weight, preferably 35-45% by weight, of the overall weight of an aerosol paint to be prepared into the aerosol can. The dry matter content of such a ready-to-use toned aerosol paint is over about 30% by weight.

Such an aerosol paint is prepared by supplementing the previously defined aerosol base paint, present in an aerosol cane, with a liquid which is present in the filling cup. The filling device has a volume of no more than 100 ml, and said liquid is produced by adding a color paste mixture with mechanized dispensing elements into the filling cup. In addition, into the filling cup can also be added water and a binder which will then be combined to base paint in the aerosol can. The added color paste mixture has a specific color tint and said color paste mixture has been formulated by dispensing into the cup each individual color paste defined by a color tone recipe of the color paste mixture in a ratio defined by a color tone recipe intended for developing the discussed tone, whereby a minimum amount Amin of the color paste as well as a total amount $A_{tot}$ of the color paste in said filling cup are dependent on the aggregate amount of a binder present in the aerosol can as well as a binder present in the filling cup.

Into the cup of a filling device, whose filling volume is 100 ml, the liquid is formulated by adding into the cup either
a) a color paste mixture and water or
b) a color paste mixture and a binder or
c) a color paste mixture, a binder, and water For example, the liquid present in the cup of a toning and dispensing device can be produced by adding into the filling cup, which has a filling volume of 100 ml, 15-25 ml of a color paste mixture as well as water or a binder or water and a binder, such that the volume occupied by the liquid of the filling cup's filling volume of 100 ml is altogether 50-100 ml. The volume of liquid in the filling cup fluctuates since different color tone recipes produce slightly dissimilar amounts of paste mixture, depending on whether the paste mixture is dark or light and whether or not the aerosol can be used as an aerosol can to be toned has already a pigment, such as $TiO_2$, present therein.

The smallest possible minimum dispensable amount $A_{min}$ for each individual color paste compound of a color paste mixture to be dispensed into a filling cup and the total amount $A_{tot}$ of the color paste mixture are thereby adapted to depend upon an aggregate total amount of a binder in the aerosol can as well as a binder in the filling cup. In this case, the total amount $A_{tot}$ of a color paste mixture is 1-30 ml, preferably 15-25 ml, and the minimum amount $A_{min}$ of an individual color paste is at least equal to the designed minimum color paste dispensing amount 0.1-0.2 ml of a dispensing machine.

Hence, each individual color paste compound included in a specified color paste mixture has been dispensed with a dispensing device element in a mechanized manner in an amount A. Said amount A depends on ratios between color paste components in the color tone recipe. The smallest dispensable color paste amount $A_{min}$ of a color tone recipe for the color paste mixture is the same as the dispensing limit of the dispensing elements of the dispensing machine.

One typical ready-to-use aerosol paint of the invention, present in a pressurized aerosol can with a filling volume of 400 ml, could here comprise a polyurethane-modified resin 80-100 g, water 5-15 g, an adjuvant 2-11 g and DME 75-95 g, packed in an aerosol can having a filling volume of 400 ml.

This sort of aerosol paint is classified as a non-combustible and its total amount of volatile organic compounds (VOC), especially DME, is not more than 27% by weight and its dry matter content is 25-35% by weight.

The propellant is preferably DME or a mixture of DME along with butane, propane, $CO_2$ or HFC-134a. Most preferably, the propellant is DME.

The aerosol base paint to be formulated into an aerosol can also be supplemented with a thinner, an auxiliary solvent and/or an adjuvant for providing a total volume $Vt=V-100$ ml for the pressurized aerosol base paint, wherein V is the filling volume of an aerosol can before the aerosol can is pressurized and sealed.

The thinner is water or a water-compatible solvent.

The adjuvant is one or more selected from the following group of: a pigment stabilizer, a corrosion inhibitor, a filler, a thickener, a bedding, a drying accelerator, a viscosity regulator, a mold inhibitor, a dispersant, an emulsifier, a foam inhibitor.

The auxiliary solvent is an organic solvent.

The invention will now be described in even more detail by way of the following non-limiting examples.

DETAILED DESCRIPTION OF THE INVENTION

Figure 2:
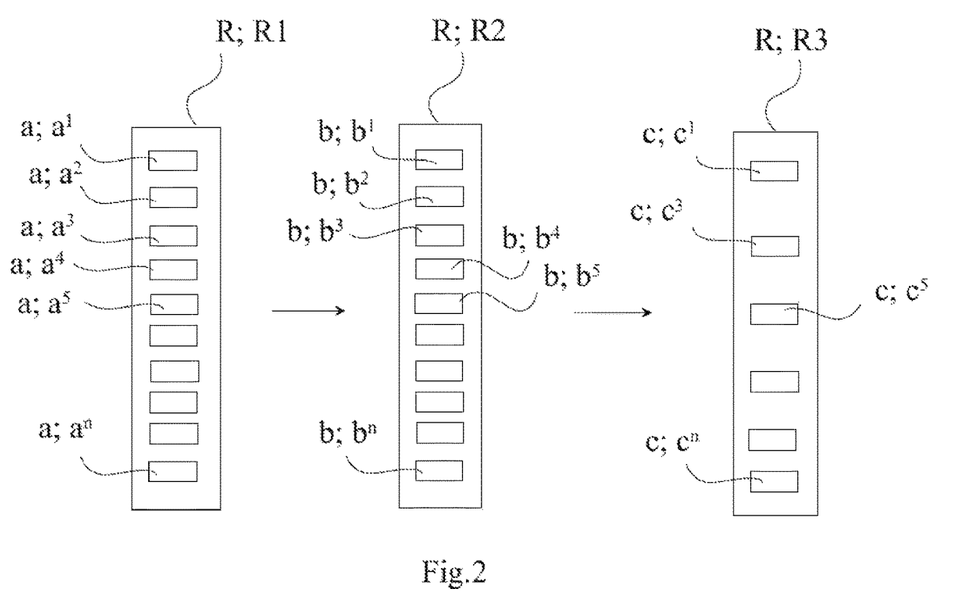
FIG. 2 presents schematically how dolor tone recipes are made in the present invention.

FIG. 2 shows the principle in forming a group of color tone recipes (R; R3) for an aerosol paint from a group of color tone recipes (R; R1) intended fora bucket paint having much bigger volume (for example 2.4 L). When a base paint of the bucket paint is tinted there are available for example a group of color tone recipes R; R1. These color tone recipes R; R1 comprises color tone recipes based, for example on RAL-system and adjusted to base paint of said bucket paint. For tinting the bucket paint there are recipes a; $a^1$, a; $a^2$ . . . a; $a''$ available each recipe defining a color tone recipe for composing a color paste mixture from corresponding individual color tone components in a known way. These recipes a; $a^1$, a; $a^2$ . . . a; $a''$ can be converted into possible group of recipes R; R2, which comprises another, potential group of color tone recipes b; $b^1$, b; $b^2$ . . . b; $b''$, for an aerosol paint. This may be done, for example simply by reducing the amount of color paste mixture and the amount of color paste compounds in each color paste mixture recipe b; $b^1$, b; $b^2$ . . . b; $b''$ because of reduced paint volume in aerosol can compared to said bucket paint volume. Usually aerosol paint is packed in an aerosol can with a filling volume from 250 ml to 1000 ml. However, all recipes of this group of recipes b; $b^1$, b; $b^2$ . . . b; $b''$ each defining how to make up a color paste mixture from its color paste compounds, is not usually possible to realize because of machine limitations and limitations in the amount of binders and pigments due to incompatibility problems with solvent system comprising a solvent and a propellant and a binder dispersed or emulsified therein. Therefore one may only end up to a group of recipes R; R3 comprising only a couple of color tone recipes c; $c^1$, c; $c^3$, c; $c^5$ . . . c; $c''$ which can be realized accurately when tinting the base paint of this particular aerosol paint.

The task of the present invention is to increase the amount of color tone recipes c; $c^1$, c; $c^3$, c; $c^5$ . . . c; $c''$ so that more of potential color tone recipes b; $b^1$, b; $b^2$ . . . b; $b''$ can be realized. This is done by taking into consideration the machine side limitations of dispensing elements (they can dispense accurately 0.1-0.2 ml of each color paste compound). Also the amount of binders and pigments should be adjusted with each other so that as many as possible from color tone recipes b; b¹, b; b² . . . b; b" could be realized. The latter is made by increasing the amount of binder.

Figure 1:
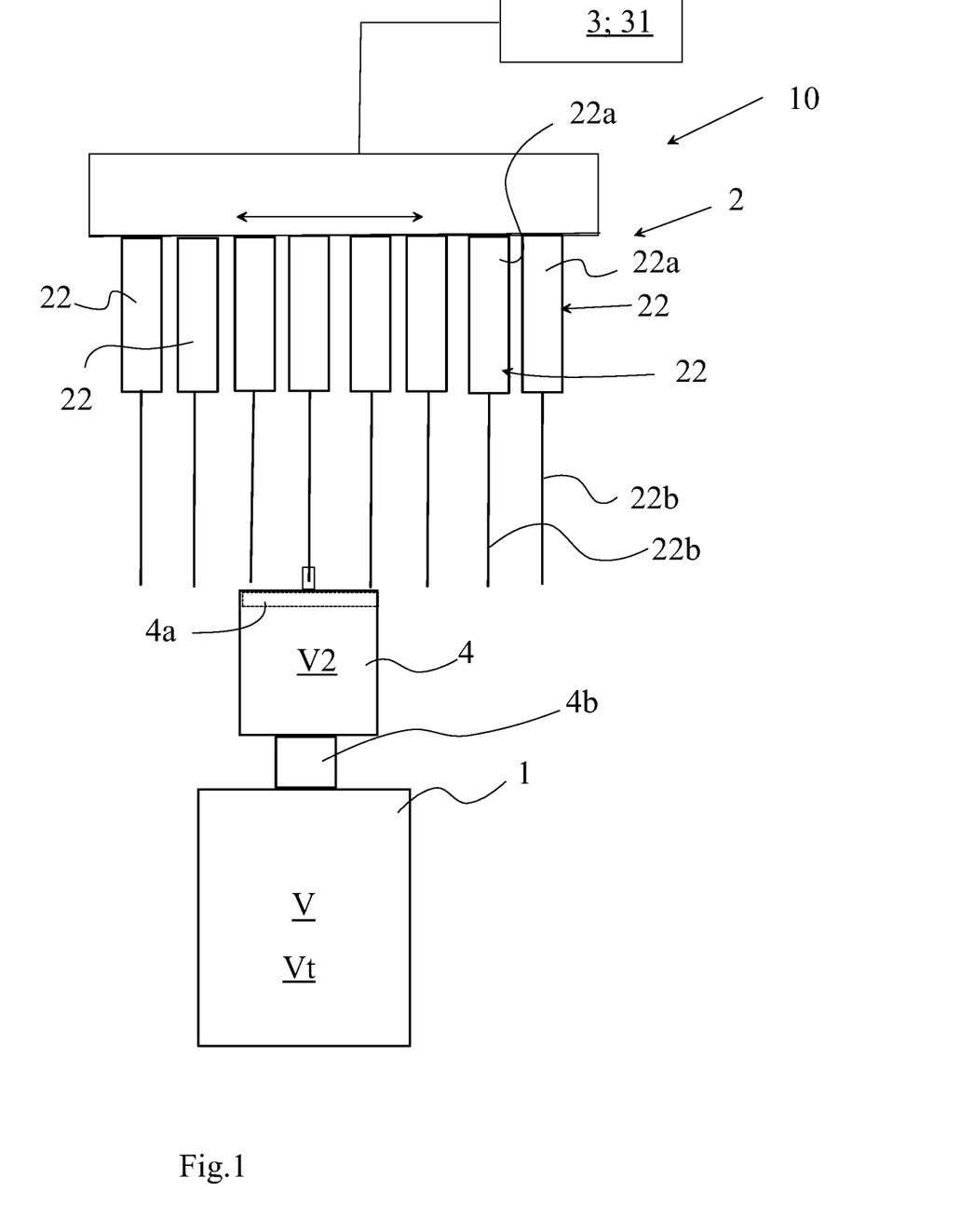
FIG. 1 presents schematically a common dispensing machine which may be used for tinting for example bucket paint.

FIG. 1 show a typical dispensing machine 10 which can be used in dispensing the color paste mixtures, water and binder into an aerosol can 1. The dispensing machine comprises a control system 3 having a proper software 31 with all color tone recipes (for example based on RAL system) and instructions how to realize each color tone recipe. The dispensing machine 10 comprises also dispensing device 2 comprising a group of dispensing elements 22. Each dispensing element 22 comprises a container 22a for a pigment paste and a dispensing channel 22b for delivering pigment into filling cup 4. Dispensing device 22 has a cylindrical body and by rotating the body each dispensing element can be brought above the filling cup 4. Filling cup 4, on its turn has a feeder tube 4b which connect the bottom of filling cup 4 to the aerosol can and pushing means 4a (for example piston) for delivering the paste mixture from the filling cup 4 to aerosol can. The filling volume of the cup is V2. After filling the filling cup 4 with the color paste mixture and possible water and binder, a piston 4a is used for pushing the content of the filling cup into the sealed aerosol can 1.

Figure 3:
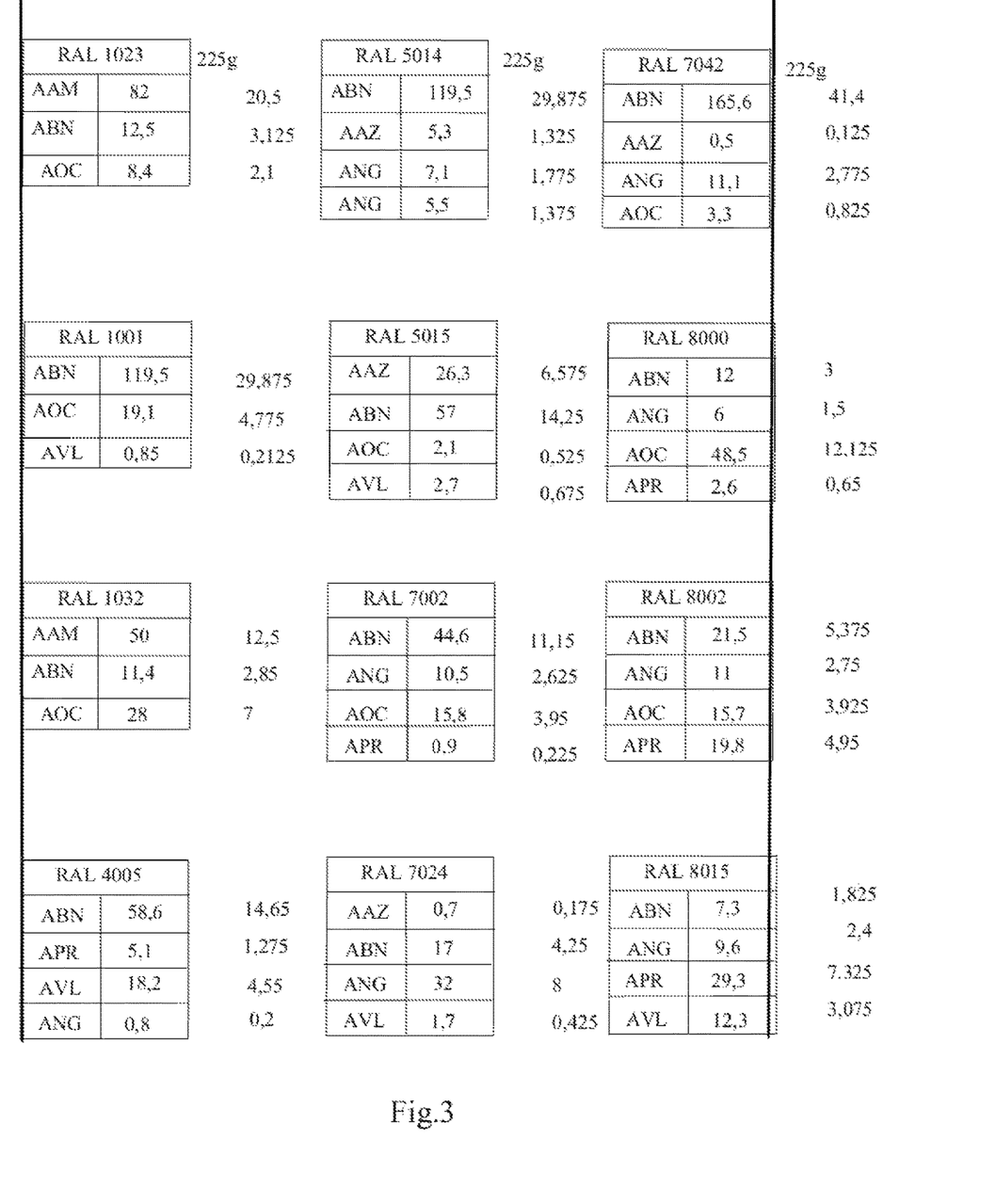
FIG. 3 shows some RAL based color recipes for bigger amount of paint (1000 ml) and converted into 225 ml of paint.

FIG. 3 shows some RAL-based color recipes for original base paint (clear base paint, 1000 ml) which were converted into 225 ml of base paint (clear base paint according to present invention).

All RAL-colors of original color system was convertible accurately into corresponding colors for an aerosol paint.

WORKING EXAMPLES

Example 1

General

A typical water-based aerosol base paint was prepared using the dispensing device shown in FIG. 1 and filled into the aerosol 1.

This kind of aerosol base paint comprises polyurethane-modified resin 80-100 g (binder), water 100-150 g, various adjuvants 2-11 g and DME 75-95 g, packed for example in an aerosol can 1 having a filling volume of 400 ml.

A Specified Composition

One typical ready-to-use aerosol base paint of the invention, present in a pressurized aerosol can with a filling volume of 400 ml, was prepared as follows:
the polyurethane-modified resin and adjuvants were dispensed into an aerosol can;
the propellant (DME) was added into the aerosol can and the can was sealed to become airtight.

Thus, the pressurized aerosol can having a filling volume of 400 ml contained the following aerosol base paint components in liquid phase:

| Component | amount/g | amount % w/w |
|---|---|---|
| Polyurethane-modified alkyd resin | 92.7 | 30.1 |
| Flow promoter (Capston) | 0.8 | 0.2 |
| Pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 121.5 | 39.5 |
| DME | 83.6 | 27.2 |
| Total | 307.0 | 100.0 |

The overall density of this aerosol base paint was about 1 g/cm³, whereby the volume occupied by the liquid phase of the aerosol can's filling volume (400 ml) was about 300 ml.

Polyurethane resin has a dry matter content of 10-60% the rest being water. Above is given the proportion of dry polyurethane resin.

Such an aerosol base paint has a high binder content (about 30% by weight) and low amount of DME (27%) by weight). This aerosol base paint is compatible with most of the commercial dispensing machines for water-based paints, i.e. it can have a pigment (color paste) dispensed therein in a mechanized manner with dispensing devices 2 having a dosing accuracy of 0.1-0.2 ml.

This aerosol base paint makes it possible to provide a paint coating with any desired gloss level (matte, semi-gloss, glossy). This base paint can be used for preparing non-flammable aerosol paints by adding water and binder.

One and the same aerosol base paint lends itself to being toned for a precisely desired tint for example with the RAL color matching system (168 color tones) or with the NCS color tone system (1668 color tones).

Instead of polyurethane-modified alkyd, it is also possible to use binders as follows: acrylic dispersions/emulsions, polyurethane, alkyds, epoxy-modified alkyds, styrene-butadiene emulsions/dispersions.

Instead of DME, it is also possible to use a mixture of DME along with butane, propane, $CO_2$ or HFC-134a.

Example 2

A water-compatible aerosol base paint, in which the binder is an acrylic dispersion:
the acrylic dispersion and an adjuvant (butyl acetate) were dispensed into an aerosol can with a filling volume of 400 ml;
the propellant (DME) was added into the aerosol can and the bottle was sealed to become airtight.

Thereby was obtained the next aerosol base paint whose density was about 1 g/cm³. The pressurized liquid phase thereof occupied again a volume of about 300 ml of the aerosol can's filling volume (400 ml)
Aerosol Paint Base Ready to be Tinted Proportion of Component

| | |
|---|---|
| butyl acetate | 4.7% w/w |
| Aqueous acrylic dispersion (binder) | 40.8% w/w (about 60% by volume) |
| DME | 54.5% w/w (about 30% by volume) |

Examples 3A and 3B

Example 3A

The aerosol base paint of example 1 was modified to get a white base paint and it was packed into an aerosol can with a filling volume of 400 ml and then toned in a mechanized manner with a commercial dispensing machine (see FIG. 1) whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol can

| | |
|---|---|
| White base paint | 247 g (185 ml) |
| DME (dimethyl ether) | 73 g (110 ml) |

Part B: Filling Cup, Added to Aerosol Can of Part A

| | |
|---|---|
| Domalkyd 0545 40 Wa or Necowel 586 N (binder) | 40 g (40% w/w emulsion in water) |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N) | 31% w/w |
| Water | 10% w/w |
| DME | 19% w/w |
| TiO2 | 25% w/w |
| Other pigments | 5-12% w/w |
| Additives | 5-12% w/w, wherein each of the additive is added 0.1-1.5% w/w |

White Base Paint Composition and its Volatile Organic Compounds
Polyurethane Modified Alkyd Emulsion
  (Domalkyd 0545 40 Wa or Necowel 586 N) 40% w/w in water, VOC Free

| | |
|---|---|
| Siccatief | 0.22% w/w |

Drier
Dextrol OC-180
  dispersing agent)
TiO$_2$
Capstone SF 65
  surface tension modifier, VOC free
BYk 349
  surface tension modifier
Rheolate 310
  rheology modifier, VOC free
Diosperbyk 199
  Wetting and dispersive agent, Voc free, pigment stabilizer
AMP
  pH modifier
Water (demineralized)
Acemat Ok 520
  solid matting agent As can be seen above none of the additives, binder or pigments contains any volatile organic compounds (VOC). The only VOC-source was DME having weight of 19% w/w of the total weight of the readymade aerosol paint in the can (400 ml). The VOC-content of this aerosol paint is 19% and it was non-flammable in a subsequent test.

Example 3B

The aerosol base paint of example 1 was modified to get a clear base paint and it was packed into an aerosol can with a filling volume of 400 ml and then toned in a mechanized manner with a commercial dispensing machine (see FIG. 1) whose minimum dispensing amount was 0.1 ml of color paste compound.

The color paste mixture was dispensed into a filling cup of the dispensing machine in an amount 1-50 ml corresponding to color tone recipe, and then into the same filling cup was added 40 ml of binder (polyurethane-modified alkyd resin). Thereby was obtained an aerosol paint toned to readiness for use, the space occupied thereby being 350-400 ml of the aerosol can with a filling volume of 400 ml.

Part A: Filled Aerosol Can

| | |
|---|---|
| Binder mix clear | 185 g (185 ml) about 71% w/w |
| DME (dimethyl ether) | 73 g (110 ml) about 28% w/w |

Part B: Filling Cup, Added to Aerosol Can of Part A

| | |
|---|---|
| Domalkyd 0545 40 Wa or Necowel 586 N | 40 g (40% w/w emulsion in water) |
| Color paste mixture | 20-50 g (20-50 ml) |

Parts A+B Combined, Main Components of the Formed Aerosol Paint

| | |
|---|---|
| Binder (Domalkyd 0545 40 Wa or Necowel 586 N E 150) | 48% w/w |
| Water | 6% w/w |
| DME | 21% w/w |
| Pigments | 7-15% w/w |
| Additives | 5-10% w/w, wherein each of the additive is added 0.1-1.5% w/w |

Clear Binder Mix Base Paint Composition and its Volatile Organic Compounds
Polyurethane Modified Alkyd Emulsion
  Domalkyd 0545 40 Wa or Necowel 586 N 40% w/w in water, VOC Free Borchi oxy coat, Voc free
  Drier
Dextrol OC-180
  dispersing agent)
TiO$_2$
Capstone SF 65
  surface tension modifier, VOC free
BYk 349
  surface tension modifier
Rheolate 310
  rheology modifier, VOC free
Diosperbyk 199
  Wetting and dispersive agent, Voc free, pigment stabilizer
AMP
  pH modifier
Water (demineralized)

As can be seen above none of the additives, binder or pigments contains any volatile organic compounds (VOC). The only VOC-source was DME having weight of 19% w/w of the total weight of the readymade aerosol paint in the can (400 ml). The VOC-content of this aerosol paint is 21% w/w and the paint was non-flammable in a subsequent test.

Example 4A and 4B

General

In the aerosol base paint of example 1, having been packed into an aerosol can with a filling volume of 400 ml, the amount of alkyd resin was modified according to which components were added from a filling cup of 100 ml into the aerosol base paint present in the aerosol can. The filling cup was again functionally in communication with dispensing device 2 of a dispensing machine 10, shown in FIG. 1. The minimum dosing amount of each dispensing elements 22 was 0.1 ml of an individual color paste component.

Example 4A

The first aerosol base paint, which was modified in terms of the amount of alkyd resin, had been modified in such a way that it could be supplemented from the filling cup 4 of a dispensing machine 10 with a color paste mixture in the amount of 1-35 ml corresponding to each color tone recipe. Additionally, into the filling cup 4 was added a binder and water 50 ml in total from the total volume 100 ml of the filling cup 4 (50% by volume of water, 50% by volume of polyurethane-modified alkyd resin). Thereby is obtained an aerosol paint toned to readiness, the space occupied thereby being 350-400 ml of the aerosol can 1 with a filling volume of 400 ml.

First Aerosol Base Paint Modified in Terms of the Amount of Alkyd Resin

| Component | amount/g | amount/w-% |
|---|---|---|
| Polyurethane-modified alkyd resin | 67.7 | 22.0 |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 146.5 | 47.6 |
| DME | 83.6 | 27.2 |
| Total | 307 | 100.0 |

Example 4B

In the second modified aerosol base paint, the amount of alkyd resin in the aerosol base paint of example 1 had been changed in such a way that it could be supplemented from a filling cup 4 of the toning and dispensing device with a color paste in the amount of 1-35 ml corresponding to each color tone recipe, and with 50 ml of water. Thereby is obtained an aerosol paint toned to readiness, the space occupied thereby being 350-400 ml of the aerosol can 1 with a filling volume of 400 ml.

Second Aerosol Base Paint Modified in Terms of the Amount of Alkyd Resin:

| Component | amount/g | amount/w-% |
|---|---|---|
| Polyurethane-modified alkyd resin | 42.7 | 13.9 |
| Flow promoter (Capston) | 0.8 | 0.2 |
| Color pigment stabilizer (Dextrol) | 0.9 | 0.3 |
| Thickener (Rheolate) | 1.8 | 0.6 |
| Drying agent (Additol) | 3.3 | 1.1 |
| Drying accelerator | 2.3 | 0.7 |
| Monoethanolamine (corrosion inhibitor) | 0.8 | 0.2 |
| Water | 171.5 | 55.8 |
| DME | 83.6 | 27.2 |
| Total | 307 | 100.0 |

Example 5

The aerosol base paint of example 1, having been packed into an aerosol can with a filling volume V of 400 ml in such a way that the liquid solvent phase occupied a 300 ml volume of the aerosol can's entire filling volume. This base point was toned to perfectly white color tone and to perfectly black color tone with the dispensing machine 10 shown in FIG. 1.

1) Base paint
   The aerosol base paint (about 300 ml) has a composition as follows:
   Dry weight 92.6 g/31.2% w/w (mostly binder)
   Total weight 297 g
2) White-toned ready-to-use aerosol paint
   Composition of the white-toned ready-to-use aerosol paint:
   Dry weight 120.3 g/32.3% w/w (mostly binder)
   Total weight 272 g
3) Black-toned ready-to-use paint
   Composition of the black-toned ready-to-use aerosol paint:
   Dry weight 115.2 g/31.8 w-% (mostly binder)
   Total weight 263 g As seen from the foregoing, both the aerosol base paint and the aerosol paint toned to readiness for use have a dry matter content of about 30% by weight.

Example 6

Water based alkyd base paint formulation in a pressurized aerosol can (400 ml).

TABLE 2

| Ingredients | % w/w |
|---|---|
| Mid-oil alkyd binder Worleesol 61A/65A 1:1(75%) in butyl glycol/sec. butanol/Dowanol PnB 1:1:1 | 24.6 |
| DMAMP 80 | 0.3 |
| Butanol | 2.1 |
| Ser ad FX thickener | 0.0 |
| Drier | 0.7 |
| Surface additives | 0.2 |
| Anti-foam additive | 0.1 |
| Ammonia | 0.77 |
| Water | 35.0 |
| Surface-tension reducer | 0.1 |
| Preservative | 0.1 |
| DME | 36.0 |
| Total | 100.0 |

The formulations of examples 6 can be tinted by using dispensing tinting machine shown in FIG. 1.

Example 7

TABLE 1

| exemplary binders to previously mentioned broader classes a-f |
|---|
| Necowel 4300 |
| Synaqua 4804 |
| Synthalat PWM 883 S |
| Worleesol E330W |
| Necowel 586N |
| Worleesol E927W |
| Domadalkyd 0545 40 Wa |
| WorleeSol NW 410 (class b) |
| Crosscore 5000 |

Synaqua 4804
APEO an ammonia and solvent free short-oil alkyd emulsion (class a)

Necowel 4300 is a co-solvent free, cationic modified medium-oil alkyd neutralized with ammonia to make it water emulsifiable (class b).

Synthalat PWM 883 S

Solvent and surfactant free medium oil urethane alkyd emulsion (class e)

Necowel 586 N

Co-solvent free, modified alkyd emulsion medium oil length (class b)

Worleesol E330W

A solvent free short-oil modified polyurethane alkyd emulsion (class f)

Worleesol E927W

A solvent free short-oil modified polyurethane alkyd emulsion (class f)

DOMALKYD 0545 40 Wa (class d)

A anionic emulsion of polyurethane resin,

Properties of Above Mentioned Binders:

NECOWEL 586 N

Cosolvent free, modified alkyd emulsion medium oil length (class b)

Necowel 586 N is an aromatic PU-modified alkyd emulsion with medium oil length.

The emulsion does not contain APEO and is free of VOC and SVOC

Analytical data ●

Solid content: 47-50

Oil length: approx. 50%

Type of oil: soybean oil ●

Viscosity: 2.0-3.5 Pas, 20° C. ● pH-value: 7-8 ●●

Solvent: water

DOMALKYD 0545 40 Wa (class d)

Characteristics

Domalkyd 0545 40 Wa is anionic emulsion of polyurethane resin, modified with vegetable fatty acids. Supplied as 40% in water.

Physical Characteristics:

| Non-volatile content 40 ± 1% DIN EN ISO 3251 | |
|---|---|
| Oil content | approx. 44% |
| Hydroxyl content (resin solid) DIN ISO 4629 | approx. 1% |
| Viscosity (100 1/s, 23° C.) DIN EN ISO 3219 | 50-500 mPas |
| pH DIN 19268 | 7-8 |
| Density approx. ISO 2811 | 1.02 g/cm³ |

SPECIAL PROPERTIES: Rapid air drying, high gloss and excellent flow.

Outstanding adhesion and elasticity. High hardness, good water and chemical resistance.

APPLICATIONS: Domalkyd 0545 40 Wa is used for yellowing-resistant top coats and one-coat paints for industrial application (air and forced drying and stowing systems) on wood, steel and aluminium with excellent gloss retention and elasticity. Domalkyd 0545 40 Wa contains no emulsifiers and may be thinned with water at all ratios. Coating systems based on Domalkyd 0545 40 Wa exhibit very rapid physical drying. However, it is advisable to use some water based dryer. The siccative should be added carefully during agitation. Domalkyd 0545 40 Wa can be blended with water reducible melamine resin. Baking conditions depends on reactivity of melamine resin (max. 140° C.).

Synaqua 4804 (Class c)

Synaqua is a short oil alkyd emulsion. APEO and ammonia free, low VOC alternative available (below 50 g/l).

| Total solids | 50 ± 1% w/w |
|---|---|
| Viscosity | 300 Cps |
| Density | 9.9 |
| pH | 7.0 |
| Solvent: | water |

WorleeSol NW 410

This is a solvent free medium oil special modified alkyd emulsion (class d).

Appearance milky liquid delivery form 46% in water

| Non-volatile content | 46% ± 2 |
|---|---|
| Oil content (1h/125° C.), Defined: DIN EN ISO 3251 | approx. 40%. |
| Viscosity, 20° C. defined: Brookfield, spindle 4/20 rpm, DIN EN ISO 2555 | max. 3,000 mPas |
| Density in 23° C. Defined: DIN EN ISO 2811-1. | 1.050 g/cm³ |

WorleeSol NW 410 resin can be used for the manufacturing of water thinnable decorative and d.i.y. paints, which especially show a good brushability, excellent levelling and good filling properties. It is especially recommended for high gloss top coats. The formulation of wood protection stains is also possible.

Necowel 4300

Cationic modified medium-oil alkyd neutralized with ammonia co-solvent free, to make it water emulsifiable (class b).

| Solid content | 41-45% |
|---|---|
| Oil length | approx. 35% |
| Viscosity (25° C.) | 50-150 mPa · s |
| pH | 5.5-6.5 |
| Solvent: | water |

Crosscore 5000

A medium oil alkyd emulsion at 50% solids (class d).

Properties:

Medium to short oil alkyd emulsion Oil length 40%

Appearance milky white Solids 50%

Contains oil type soybean fatty acid co-solvent free and Amine free

Particle size±200 nm

Viscosity 20 mPas at 23° C. pH±7.

This resin is an example of resins of broader class d)

Additional properties: alkyd emulsion which is VOC free and don't need co-solvents to dry. There is no further VOC release after through drying and hardening.

Use: Interior and exterior primers and topcoats for wood, metal and joinery application, Corrosion resistant primers.

Worleesol E330W

Short oil modified PU alkyd emulsion, water thinnable (class f)

| Non-volatile content defined: DIN EN ISO 3251 | 42 ± 2 |
|---|---|
| Oil content about | 33% |
| Viscosity defined DIN EN ISO 2555 | max 10,000 mPa · s |

| | |
|---|---|
| Acid value, on solids defined DIN EN ISO 2555 | 15-20 |
| pH | 7.5-8.5 |
| Density 20 C defined DIN EN 151 2811-1 | 1.046 g/cm$^3$ |
| Delivery: 42% in water, VOC free. | |

Worleesol E927W

Short oil PU alkyd emulsion (class f), for water-borne solvent systems Good compatibility with acrylic dispersions

| | |
|---|---|
| Non-volatile content Defined: DIN EN ISO 3251 | 40% ± 2 |
| Oil content | approx. 27% |
| Density, 20° C., Defined: DIN EN ISO 2811-1 | approx. 1.04 g/cm$^3$ |
| Acid value, on solids, Defined: DIN EN ISO 3682 | max. 30 |
| pH-value Defined: DIN ISO 976 | 6.8-7.5 |
| Viscosity (20° C.), Defined: DIN EN ISO 2555 | max. 10.000 mPas |
| Appearance milky liquid | |

Synthalat PWM 883 S

Solvent and surfactant free, urethane alkyd emulsion based on medium oil resin, with xylene below 0.1%

| | |
|---|---|
| Oil content Special drying fatty acid Supplied 45 % in water | approx. 45% |
| viscosity in mPas (in-house method AV-F-V005) | 200-700 (as supplied) |
| non-volatile content (in-house method AV-F-F003) | 45 ± 2% (as supplied) |
| pH-value (as supplied) (in-house method AV-F-P001) | 7.0-9.0 |
| acid value (house method AV-F-S001) o | in mg KOH/g < 30 |
| Organic solvents | acetone < 0.3% |

Synthalat PWM 883/45% is suitable as sole binder for fast drying water based industrial lacquers with reduced amount of dryers.

Additives

In the present invention additives as selected to be either VOC-free or having low VOC-content. The VOC-values for any additive can be easily taken from supplier's product catalogues and safety datasheets. If there is any volatile organic compound in a specified additive, it must be mentioned in the safety datasheet for this additive.

Below have been given some non-restrictive guidelines for choosing VOC-free and low-VOC additives for aerosol paint compositions of the present invention.

Wetting and dispersing additives for waterborne application use electrosteric stabilization. The amount of added dispersing depends mainly on the pigment quality being usually on the very broad range of 6-90% calculated from the amount of the pigment.

Some Exemplary VOC-Free Wetting and Dispersing Additives for Water-Borne Paints:

Byk 191, which is a solution of a copolymer with pigment-affinity groups in water. The additive deflocculates pigments by means of steric stabilization.

TEGO® Dispers 653, which is a pigment-wetting and dispersing additive. This additive has modified polyether with groups of high pigment affinity.

Defoaming agents. To prevent foam and destroy any foam present, defoamers have to be added to the formulation. Most defoamers are also effective to some degree as deaerators and the reverse is true. A defoamer must be insoluble in the formulation to be defoamed where it should be present in the form of finely divided droplets. Furthermore, it is necessary for it to be sufficiently compatible with the medium to be defoamed not to cause surface defects such as craters. Most used defoaming agents are polydimethylsiloxanes and modified polysiloxanes.

Some Examples of VOC-Free Defoamers/Deaerators

Tego Airex 902W. Emulsion of a polyether siloxane copolymer, contains fumed silica. Non-volatile content approx. 24%. Addition level calculated on total formulation: 0.2-3.0%.

Tego Foamex 840. Polyether siloxane copolymer, silica-free. Technical information—appearance clear liquid—active matter content 100%

Addition level calculated on total formulation: 0.05-0.5%. Addition may be either in the grind or during the let-down procedure.

Byk 1617. Emulsion of foam-destroying polysiloxanes, hydrophobic solids and emulsifying agents. Density (20° C.): 1.00 g/ml Non-volatile matter (60 min, 105° C.): 12.5%. Carrier: Water Viscosity modifiers. In waterborne formulations, the binder is in the form of dispersed polymer particles so that regulation of the flow behavior by changing the molecular weight is not possible. Rheological additives (thickeners) must therefore be used to adjust the flow properties of waterborne coatings and printing inks. Rheological additives can be roughly separated into inorganic and organic thickeners or thickeners for solvent borne or waterborne coatings.

Below are examples of modified inorganic thickeners for solvent borne and water-borne systems. This list is not intended to be comprehensive.

Water-borne and solvent-borne systems: Bentonite, synthetic lattice-layer silicate, pyrogenic silica (sometimes organically modified).

Examples of organic thickeners for waterborne and solvent borne systems include: polyureas, cellulose derivatives, polyamides. Examples of organic thickeners for water borne coatings include: associative thickeners, non-associative thickeners.

Adhesion promoters (AP) are bi-functional materials that increase adhesive strength between the coating and the substrate and sometimes are referred to as coupling agents.

Titanates and zirconates are coupling agents and adhesion promoters that increase impact strength and chemical resistance and enhance physical, compounding and application properties.

Monomeric phosphate chemistries and phosphate esters are materials used in free-radical emulsion polymerization and provide wet adhesion bonding to the substrate.

Oligomeric Silanes

The first-generation coupling agents that are still used to improve adhesion are mono-functional. These mono-functional silane adhesion promoters are more and more substituted by oligomers. The oligomer molecules have a moderately high molecular weight and multiple functionality in both types of reactive groups: Methoxy (—O—CH3) groups, directly linked to silicon (Si) atoms, which form a covalent bond with the hydroxyl (—OH) groups of the metal substrate. Epoxy groups that cocrosslink with the binder system during film formation. The core of the additive is formed by a strong siloxane network that has excellent resistance against, for example, hydrolysis, chemicals and UV radiation. Despite the increased molecular weight, compared to mono-functional silanes, the oligomer has a low viscosity and a broad compatibility.

Example 8

Aging Comparison Test
General
The spray pattern delivered from an aerosol can is a combination of the content of the can proportions, being the amount of liquefied propellant, the pressure, viscosity and of course how fine are the solid particles that have to be transported through the valve and the actuator.

As an indication the diameter of the openings in the valve and actuator during the spraying are between 0.1 mm to 0.5 mm.

This means if paint in the can starts to flocculate or is the binder gets attacked by the propellant (DME) and cloaks together this will have a direct impact on the spray result. This can lead to solid particles disturbing the wet film and being visible in the dry film until totally blocking of the valve and actuator.

Aging tests have been done with the formulations 1-3.
Formulation 1
Colored top coat based on mix of polyurethane modified short and medium oil alkyd emulsion (composition according to invention)

| Ingredients | % w/w |
|---|---|
| Worleesol E927W | 25.00 |
| Domalkyd 0545 40 Wa or Necowel 586N | 30.00 |
| dispersing agent byk 191 | 0.25 |
| defoamer byk 015 | 0.20 |
| flow/slip additive tego glide 110 | 0.18 |
| thickener (Tixothrope)Tafigel pur 60 | 0.10 |
| thickener (tixothrope) Byk 525 | 0.16 |
| color paste mixture | 10.00 |
| Water | 11.11 |
| Dimethyl ether | 23.00 |
| Total | 100.00 |

Formulation 3I: Acrylic dispersion based colored top coat

| Ingredients | % w/w |
|---|---|
| EPS 294 (405 w/w in water) | 35.00 |
| thickener Rheolate 310 | 0.40 |
| Tego glide 110 | 0.30 |
| Bentone SD2 | 0.13 |
| Color paste mixture | 8.00 |
| Texanol (solvent no VOC) 3-pentanediol, 2,2,4-trimethylmonoisobutyrate) | 4.00 |
| Water | 17.17 |
| dimethyl ether (DME) | 35.00 |
| Total | 100.00 |

Formulation 3I
Clear Acrylic Varnish:

| Ingredients | % w/w |
|---|---|
| Joncryl 538 (acrylic dispersion) | 32.40 |
| Joncryl 683 (low mol weight acryl 98% in solvent) | 9.00 |
| diethyleneglycol monobutylether (non-flammable but it will burn. UEL 6.2 LEL 0.9% in air) | 4.00 |
| Isopropanol | 3.00 |
| Defoamer byk 015 | 0.30 |
| Acemat 520 (hydrophobic fumed silica) | 0.40 |
| Thickener DSX 3290 | 0.55 |
| water | 10.35 |
| Dimethyl Ether | 40.00 |
| Total | 100.00 |

Results
After aging tests in the oven at 40° C. and 20° C. with intervals of 1 week spray test have been performed.
Formulation I
1 week high gloss good opacity no spray defects Eventually this formulation has a shelf life of app 3 years at 20° C.
Formulation 2
1 week little lower gloss than fresh can at start of the test. opacity ok
2 weeks solid particles in the spray interrupting the spray pattern and visible in the wet and dry film.
3 weeks after vigorously shaking the shaking balls were free a pray attempt was made but the valve/actuator system was blocked completely. After degassing the can (uncultured with a pin) the paint in the can was observed. It showed total coagulated binder and color pigment.
Conclusion: not stable, short shelf life
Formulation 3
Immediately (timeframe app 1H) after making the can it was impossible to spray for the moment the actuator was pushed down the valve and the actuator blocked completely.
After degassing the can (uncultured with a pin) the paint in the can was observed. It showed total coagulated binder and color pigment.
Conclusion: Nor stable, very short shelf life

The invention claimed is:
1. A water based solvent system comprising water, propellant, and an optional organic co-solvent, for tinting an aerosol paint in an aerosol can with a filling device having a cup having functionally connected thereto mechanized color paste dispensing elements which enable dispensing into the cup a liquid containing a color paste mixture in an amount A, which solvent system comprises:
a liquid present in the cup of an aerosol can filling device, which liquid occupies a volume V1 of a filling volume V2 of the cup, comprises with respect to its volume V1:
a color paste mixture 10-100% by volume having a predetermined color tone, water 0-90% by volume and a binder 0-90% by volume,
the color paste mixture being made up of several color paste components, each of which have at least a volume $A_{min}$, by dispensing into the cup with the mechanized dispensing elements, each of said individual color paste components in a ratio defined by a recipe of a color paste mixture tone, wherein
a base paint to be tinted comprises an emulsified binder and a propellant, and said base paint is dispersed into a water compatible solvent present in the aerosol can having a filling volume V and occupying as a liquid under pressure a total volume of $V_t$ of said filling volume V, and
the base paint to be tinted comprises, with respect to total weight: a binder and a separate dispersing agent/emulsifier or an emulsified binder 15-80% w/w, wherein the binder is an acryl resin, an alkyd resin, an oil-modified alkyd resin, an epoxy resin, a polyurethane resin, a polyurethane-modified alkyd resin, a styrene-butadiene emulsion or a styrene-butadiene dispersion, and wherein the base paint comprises a propellant 18-45% by weight, wherein the propellant is selected from the group consisting of dimethyl ether (DME) and a mixture of DME and butane, propane, $CO_2$ or 1,1,1,2-tetrafluoroethane, and said recipe of the color paste mixture tone is selected from the group of different recipes in which each recipe defines an exact amount of each individual color paste compound to make up the color paste mixture having a predetermined color tone so that:

a total volume and the total amount $A_{tot}$ of the color paste mixture have been adapted to depend on the aggregate volume and the amount of the binders in the aerosol can and in the filling cup; and the minimum volume $A_{min}$ of each color paste component dispensed into the filling cup is 0.1-0.2 ml which minimum volume $A_{min}$ is adapted to be same as the minimum paste volume requirement for the base paint to be toned in an accurate way, wherein said accurate toning means that the maximum color deviation of dE is 1.0, from the intended color tone of the toned base paint.

2. The solvent system of claim 1, wherein a dry content of the binder is in a range of 25-45% by weight of the base paint to be tinted.

3. The solvent system of claim 1, wherein the minimum volume $A_{min}$ of a color paste compound is 0.1-0.2, which minimum volume $A_{min}$ is adapted to be the same as the minimum dispensing volume of the dispensing element for tinting the base paint into the intended color tone.

4. The solvent system according to claim 1, wherein the group of different recipes originates from color tone recipes for color paste mixtures intended to be used to tint the base paint for a bucket paint having a larger volume of solvent system than an aerosol paint.

5. The solvent system according to claim 4, wherein color tone recipes for color paste mixtures intended to be used to tint the base paint for a bucket paint having a larger volume of solvent system than an aerosol paint have been converted into color tone recipes for tinting the base paint of the aerosol paint by keeping color strength intact but reducing overall amount of solvent in the solvent system.

6. The solvent system according to claim 1, wherein the propellant is dimethyl ether (DME).

7. The solvent system according to claim 1, wherein the binder is selected from the group consisting of:
   a) saponified/neutralized short oil alkyd which is water dilutable/emulsifiable having less than 40% of fatty acids,
   b) saponified/neutralized medium oil alkyd which is water dilutable/emulsifiable having 40-60% of fatty acids,
   c) emulsified/dispersed short oil alkyd having less than 40% of fatty acids,
   d) emulsified/dispersed medium oil alkyd having 40-60% of fatty acids,
   e) emulsified/dispersed polyurethane modified alkyd having 40-60% of fatty acids, and
   f) emulsified/dispersed polyurethane modified alkyd having less than 40% of fatty acids.

8. The solvent system according to claim 6, wherein the oil content of resin is about 44%, the acid value of solids maximum 30 and pH-value of 7-8.

9. The solvent system according to claim 1, wherein the liquid present in the cup is produced by adding into the cup either
   a) a color paste mixture and water, or
   b) a color paste mixture and a binder, or
   c) a color paste mixture, a binder, and water.

10. The solvent system according to claim 1, wherein the cup has a filling volume (V2) of 100 ml.

11. The solvent system according to claim 10, wherein the liquid present in the cup is produced by adding into the cup 15-25 ml of a color paste mixture, and adding water, a binder, or water and a binder to a filling volume V2 to be 50-100 ml.

12. The solvent system according to claim 1, wherein each individual color paste included in the color paste mixture has been dispensed into the cup in a mechanized manner without mixing in the amount A defined by the color tone recipe for the color paste mixture.

13. The solvent system according to claim 1, wherein the aerosol base paint to be tinted and the liquid in the cup are adapted to have an aggregate binder content of 15-45% by weight, of the aerosol can's filling volume, of the total weight of a tinted aerosol paint to be prepared into the aerosol can.

14. A water-based aerosol paint, in a solvent system defined in claim 1, for a pressurized and sealed aerosol can with a filling volume V, wherein the aerosol paint comprises:
   a color pigment;
   a binder dispersed into a water-compatible solvent comprising water, wherein the binder is selected from the group consisting of an alkyd resin, an oil-modified alkyd resin, an epoxy resin, a polyurethane resin, a polyurethane-modified alkyd resin, a styrene-butadiene emulsion, and a styrene-butadiene dispersion;
   a propellant, selected from a group consisting of DME, and a mixture of DME and butane, propane, $CO_2$ or 1,1,1,2-tetrafluoroethane, and
   an optional co-solvent 20-45% by weight, wherein
   said water compatible solvent comprises DME 18-45% by weight, and the rest being water, and wherein a dry content of said binder is 20-45% by weight from total weight of the paint.

15. The water-based aerosol paint according to claim 14, wherein the dry content of the paint is 30-35% w/w.

16. The water-based aerosol paint according to claim 14, wherein the paint contains one or more adjuvants selected from the group consisting of a pigment stabilizer, a corrosion inhibitor, a filler, a thickener, a bedding, a drying accelerator, a viscosity regulator, a mold inhibitor, a dispersant, an emulsifier, and a foam inhibitor.

17. The water-based aerosol paint according to claim 14, wherein the aerosol paint comprises: a polyurethane-modified resin 80-100 g, water 5-15 g, an adjuvant 2-11 g, and DME 75-95 g, packed in an aerosol can having a filling volume (V) of 400 ml.

18. The solvent system of claim 1, wherein the binder is an acrylic resin selected from an acrylic dispersion or an acrylic emulsion.

* * * * *